United States Patent [19]

Urban et al.

[11] 4,331,325
[45] May 25, 1982

[54] BASKET DESIGN

[75] Inventors: Todd A. Urban, Fleetwood; Terry R. Oxenreider, Wernersville, both of Pa.

[73] Assignee: General Battery Corporation, Reading, Pa.

[21] Appl. No.: 139,413

[22] Filed: Apr. 11, 1980

[51] Int. Cl.³ .............................................. H01M 2/00
[52] U.S. Cl. ...................................... 269/43; 269/152; 269/254 CS; 269/287; 269/903; 29/730
[58] Field of Search .................. 269/43, 254 CS, 287, 269/152-153, 903, 909; 164/DIG. 1; 211/51; 29/730

[56] References Cited

U.S. PATENT DOCUMENTS

| | | | |
|---|---|---|---|
| 502,783 | 8/1893 | Staley | 211/51 |
| 669,564 | 3/1901 | Vavdt | 211/51 |
| 1,552,519 | 9/1925 | Ulrich | 211/51 |
| 3,800,958 | 4/1974 | Dorn | 211/51 |
| 3,912,544 | 10/1975 | Sabatino | 164/DIG. 1 |
| 4,016,638 | 4/1977 | Klein | 29/730 |

Primary Examiner—Robert C. Watson
Attorney, Agent, or Firm—Benasutti Associates, Ltd.

[57] ABSTRACT

A basket apparatus for clamping a plurality of plate stacks sufficient to form one multi-celled, lead acid storage battery during the casting of the lug commoning straps in each stack is provided. As configured it comprises a frame defining a plurality of internal cavities each configured to hold one of said stacks and a set of individually biased movable clamping plates, one in each of said cavities, each adapted to hold the stack firmly in position during the casting operation. The individual biasing permits firm gripping regardless of any variability in plate or stack thickness.

5 Claims, 4 Drawing Figures

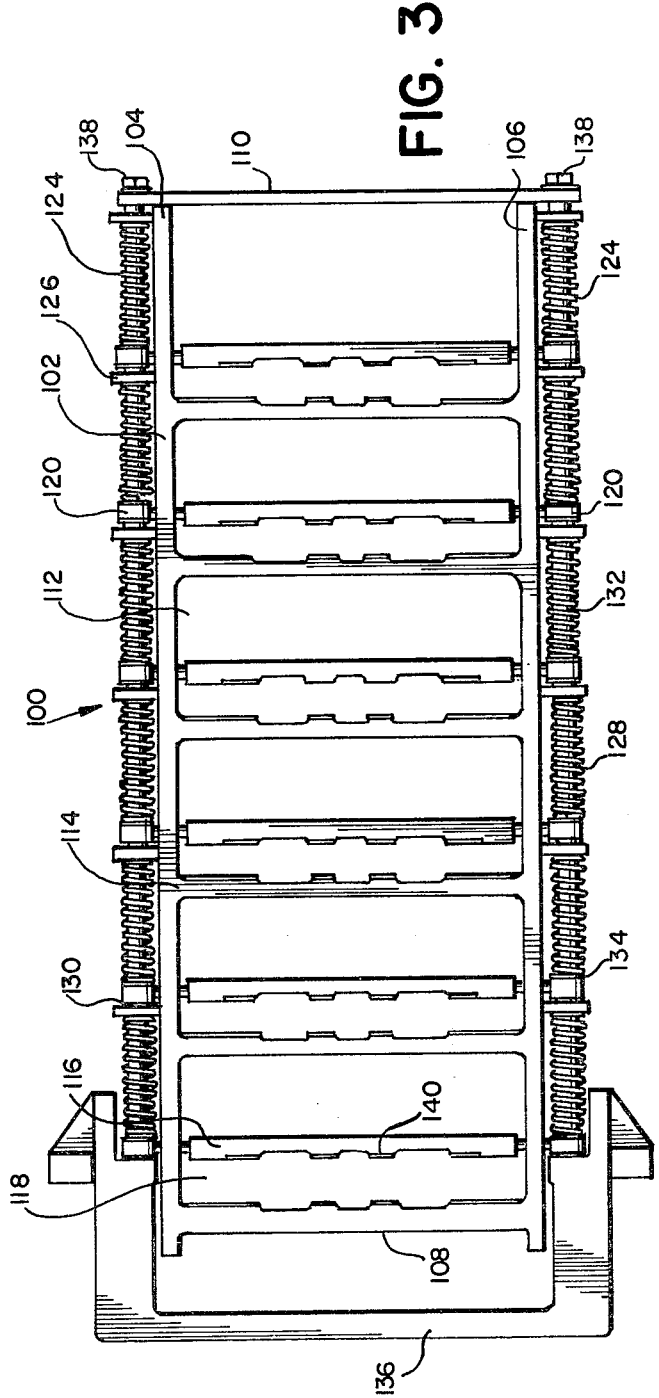
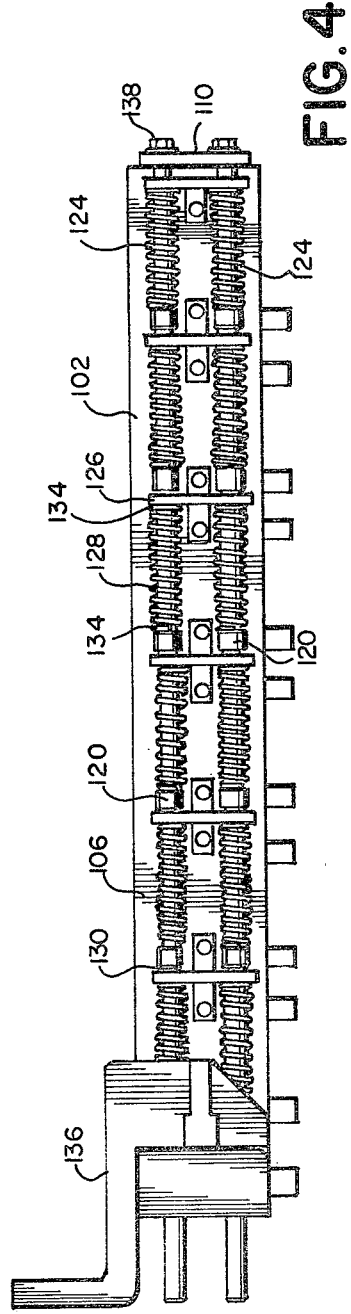

BASKET DESIGN

BACKGROUND OF THE INVENTION

The subject invention relates to an apparatus for assembling a stack of alternating positive and negative plates which together form a cell for use in multi-celled lead acid storage batteries as generally employed for automotive industrial and commercial applications.

The construction of a lead acid storage battery is generally accomplished by the series assembly of a plurality of discrete cells formed within a battery case, each cell having a nominal voltage when charged, of about 2.0 volts. Each cell is constructed by combining a plurality of alternately arranged rectangular, relatively thin positive and negative plates to form a stack. As fabricated each of these plates has an upstanding lug and the plates are situated within the stack so that all of the positive plate lugs lie along one side and all of the negative plate lugs lie along the opposite side. As assembled, the stack has an insulating separator placed between the plates to prevent the positive and negative plates from shorting out after a subsequent charging step.

In the production of battery plates, as in the production of most high volume, mass produced items there is a tolerance level within which the plates must be produced in order to be acceptable. However, within this tolerance, it is possible that there is a substantial variability both among the plates used within any given stack to form a cell and between the plurality of stacks which are assembled to form a battery. In the production of the battery, it would be highly advantageous if this variability could be accommodated and operated on in a single cycle of the production equipment used. This is especially critical at the processing stage where the positive lugs and the negative lugs within a cell have a commoning strap cast on them prior to the placement of the intercell connectors for the series assembly step.

One apparatus widely used for accomplishing task of commoning the battery lugs within each stack is the Farmer Cast-On-Strap (COS) machine. The Farmer Apparatus is adapted to produce, in a single cycle, a plurality of final assembled stacks sufficient to assemble one battery. The strap casting operation is done within the Farmer apparatus by holding the stacks with a device commonly referred to as a basket while the straps are cast onto the lugs. An example of a basket used with such apparatus is shown in prior art FIG. 1.

Referring now to FIG. 1, we see an isometric view of the Farmer Basket 10. As shown, is a boxlike structure comprising a square-cornered open frame 12 having sidewalls 14 and 16 and a front wall 18 which is square with both of the sidewalls. Further connected to the inner portion of the sidewalls is a plurality of fixed, regularly spaced divider plates 20 which are parallel to front wall 18 and act to form a series of internal cavities 22 within the area defined by frame 12. Frame 12 has no bottom per se but is adapted to fit on a mounting plate (not shown) which is a part of the Farmer Machine. When so mounted, Basket 10 can accommodate plates in either the lugs up or lugs down position.

Slidingly mated to the sides of Frame 12 is a compression frame 24. As shown, this comprises a square-cornered yoke fitted around and over end wall 18 and having a pair of side panels 26 and 28 which lie along the outer portion of sidewalls 14 and 16 and an end panel 30 which fits over and closes off the open end of Frame 12 to form the rearmost cavity 22 within frame 12. Connected to the top and bottom edges of side panels 26 and 28 by lugs 29 and parallel with end panel 30, is a plurality of clamping plates 32 which are disposed so that one of them lies and is reciprocally movable back and forth within each of cavities 22. As configured the compression plates are normally biased to be in a closed position which places them adjacent to the front divider plate of the cavity in which it is placed.

Further connected to compression frame 24 is handle 34 which is attached to the side panels by bolting, riveting or any other suitable means of attachment to form a yoke around frame 12. Machined into both side panels is a pair of horizontal slots 36 through each of which a lug 38 is mounted onto the sidewall. Connected between these lugs on the outsides of each side panel is one of a pair of extension springs 40 which create the compressive force which biases the compression plates to stay in a closed position.

When it is desired to insert a set of plate stacks into the basket, the Farmer machine clamps frontwall 18 and pushes out on handle 34 so that the basket frame 12 and compression frame 24 start to slide past each other as they are forced to part. In so doing, clamp plates 32 are pushed back from their normal closed position against the divider plates 20 to create a plurality of secondary rectilinear spaces 42 between the separated movable clamping plates 32 and the front stationary divider plate 20 in each of cavities 22. At the same time, the forwardmost ends of the slots 36 bear on lugs 38 which stretches the extension springs 40 and places them in tension. When the Farmer Machine stops pushing, the spaces 42 are open to a point where they are oversize relative to the plate stacks 44, which allows said stacks to be easily inserted therein by the machine operator. When the requisite number of stacks have been inserted into the opened spaces the Farmer Machine releases the pushing force at which time, the two extension springs 40 contract and attempt to return the two sliding sections back to the normal closed position. This return motion continues until one of the clamping plates 32 makes contact with the thickest of the battery stacks 44 within basket 10. Since all of the compression plates must move in and out as a unit, this return motion will therefore stop as soon as the first contact is made with that stack. Should it be noticeably thicker than one or more of the other stacks in the assembly, a problem arises with the thinner stacks not being as tightly clamped as the remainder. Consequently, when the basket moved to further process steps in the battery assembly line, it is quite possible that one or more of these thinner stacks will wobble to produce defective straps or even fall out of the basket. When this happens it is necessary that the system be stopped while the stack is replaced or a substitute, more evenly compressed basket is put in that position. The economics of the production line dictate that such events happen as infrequently as possible.

It is this problem which the preferred embodiment of the subject invention is intended to address. The instant invention is an improved basket device for use in an apparatus such as the Farmer COS Machine. The purpose of this basket device is to secure and move an assembly of stacks regardless of the variability in their composite thickness through the processing steps needed to common the cells used to form a finished battery.

SUMMARY OF THE INVENTION

The subject invention is a basket adapted to work with a battery assembly unit such as a Farmer COS Machine. It is adapted to replace the prior art apparatus illustrated in FIG. 1 for this application and differs from it in that it acts to clamp all the stacks evenly regardless of their thickness variability when they are placed therein. The improvement described therein occurs because each of said compression plates is adapted to act independently on the stacks so that it makes no difference whether the stacks are substantially thinner or thicker than the norm. To do this, each one of the compression plates is individually biased by separate spring means so that when activated, they act independently of the other compression plates within the basket. By so doing, each stack is separately clamped and the pressure exerted on it is uniform regardless of the total stack thickness in any particular cavity.

It is therefore the object of the subject invention to provide an improved basket for clamping an assembly of battery plate stacks prior to having commoning straps cast thereon which provides even clamping pressure on the stack regardless of the thickness variability of the stacks therein.

This and other objects of my invention will become apparent from the following description with reference to the accompanying drawings.

BRIEF DESCRIPTION OF THE DRAWINGS

FIG. 3 is a top plan view of a basket according to the subject invention.

FIG. 4 is a side view of a basket according to the subject invention.

DESCRIPTION OF THE PREFERRED EMBODIMENT

Figure 1:
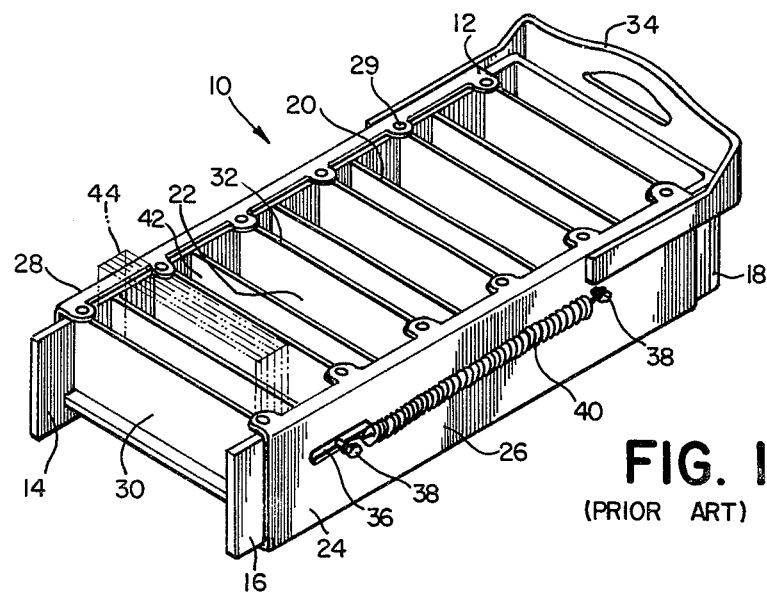
FIG. 1 is an isometric drawing of a prior art basket.
Figure 2:
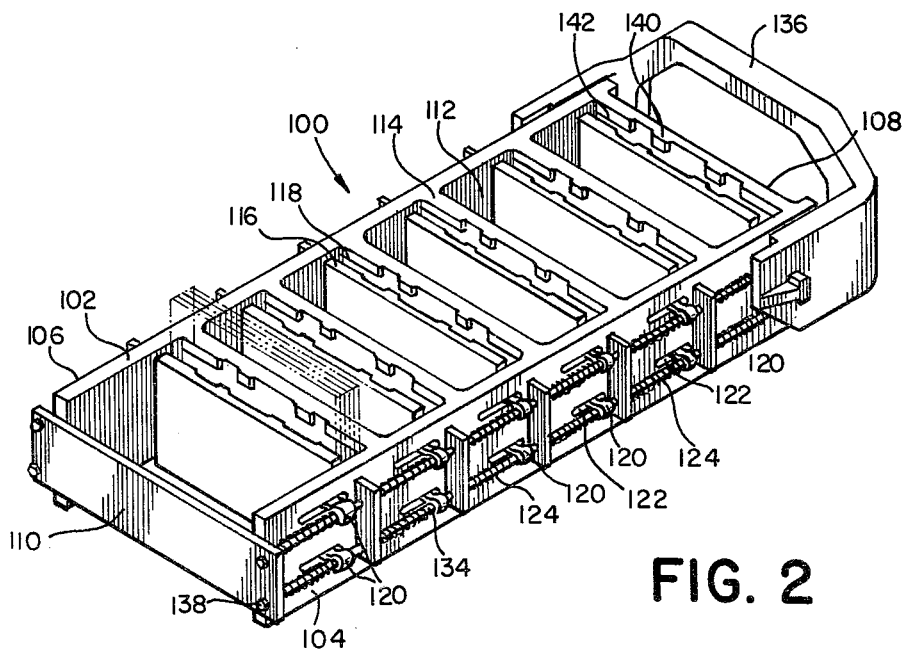
FIG. 2 is an isometric drawing of a basket according to the subject invention.

Looking now at FIGS. 2, 3 and 4, we see views of a preferred embodiment of a basket 100, according to the subject invention. In its general, external form, it is similar to the prior art device illustrated in FIG. 1 in that it is basically composed of a square cornered frame 102, which is defined by a pair of sidewalls 104 and 106, a front wall 108 and an end plate 110. As with the prior art device, the basket is adapted to support the inserted plate stacks 44 in either the lugs up or lugs down condition.

Within the preferred form of frame 102, there is a plurality of cells or cavities 112 which are defined by a plurality of regularly spaced fixed divider plates 114 located along the interior lengths of sides 104 and 106 and which are parallel to front wall 108. Again, as with the prior art device, each of these cavities contains a movable clamping plate 116 which is adapted to reciprocally move back and forth within said cavity to create a space 118 into which the cell stacks 44 are subsequently inserted for processing. Each of clamping plates 116, has attached to it, as shown, a set of four swingbolt lugs 120, two of which are attached respectively to its left and right sides through a set of matched horizontally disposed slots 122, which are machined into sidewalls 104 and 106 along each cavity.

As shown most clearly in FIG. 4, the swingbolt lugs are mounted so that they form parallel upper and lower rows along the outer sides of the frame sidewalls and each slot retaining them is roughly as long as the particular cavity 112 behind it. Thus, each of the clamping plates 116 can move freely back and forth within the confines of the particular cavity in which it is placed.

Each of swingbolt lugs 120 has a horizontal hole (not shown), machined into its head. This hole is slightly larger than the diameter of one of a set of shafts 124 which pass through these holes from the front to the rear of frame 102. Further supporting these shafts in place are a set of spring pads 126 one of which is attached to the outer sides of the sidewalls just forward of the front end of each of slots 122. These act to limit the forward movement of the swingbolt lugs on the shaft and therefore provide a limit to the forward movement of the clamp plates within their cavities. In this arrangement, the shafts are effectively broken up into a series of more or less equal segments 128. At the forward end of each of these segments there is a machined retaining ring groove (not shown), which is adapted to receive a perpendicular retaining ring 130. These grooves are so placed that when the clamping plates are in the most forward position, i.e. fully closed, the forward bearing face of each of swingbolt lugs 120 will rest against the forward end of the slot in which it is placed. In the closed position, the forward bearing face of each swingbolt lug will also rest up against the rearward bearing face of retaining ring 130. Holding the swingbolt lugs in this position are a plurality of compression spring segments 132 each of which fits between a pair of spring retaining cups 134, one placed in rear face of each swingbolt lug the other in the forward face of the shaft hole in each spring pad 126. The front end of each of the four shafts 124 fits into and is clamped by basket yoke 136. The rear ends of the four shafts are bolted on to the end plate 110 by bolts 138 which act to retain the place 110 in place, i.e., it is not welded or otherwise attached permanently to frame 102.

When the time comes to insert a plurality of stacks 44 into the spaces 118, the Farmer Machine, as with the prior art basket, clamps onto front wall 108, while rearwardly pushing on yoke 136. When this happens each one of the four shafts 124 moves rearward causing each of the retaining rings 130 to push upon the corresponding swingbolt lug 120 thus, moving its associated clamping plate backward. In so doing, each of the spring segments 128 is compressed between its retaining cups 134 as the clamping plates move away from the front divider walls of each cavities 112. When the movable clamping plates have been moved to the rear of cavities 122, the motion stops and the machine operator, as before, can insert a plate stack into each of the oversized spaces formed within frame 102. After the requisite number of plates stacks have been inserted into the basket, the pushing force on yoke 136 is relaxed whereupon each of the compression spring segments 128 relieves its compressive state by pushing the swingbolt lugs in a forward direction towards the normal closed position. In this action, each clamping plate is individually biased by its own set of spring segments which are separate and independent from that biasing the other stacks so that in the event a particular compression plate 116 contacts a thicker than normal stack, the compression plates in the other cavities are not affected, that is, they continue moving backwards towards the closed or rest position until each one of them makes separate, distinct and complete contact with the stack of plates within its particular cavity.

The clamping and divider plates having one other feature which acts to assure a uniform firm contact with the stacks. As shown most clearly in FIG. 2, these plates unlike the corresponding members of the Farmer basket as shown in FIG. 1 are not smooth. Rather they have a set of vertical ridges 140 which in turn have a plurality of horizontal triangular wedges 142. Under the stimulus of the expanding springs these wedges firmly grip the front and rear outermost plates in each stack and hold them in place to further assure that, in subsequent processing, the stacks will not wobble or break loose and fall out.

It is to be understood that the foregoing suggested apparatus as exemplified by the figures, is intended to be illustrative of a preferred embodiment of the subject invention and that many options will readily occur to those skilled in the art without departure from the spirit or the scope of principals of the subject invention.

What I claim is:

1. An apparatus for clamping a plurality of plate stacks used to form the series connected cells of a lead acid storage battery, each of said stacks comprising a plurality of alternating more or less rectangular positive and negative plates with an insulating separator placed therebetween, each of said plates having an upstanding lug, said plates being disposed within said stacks so that all of the positive lugs lie along one side of the stack and all of the negative lugs lie along an opposite side, said apparatus comprising:
   (a) a frame, said frame being more or less rectangular and further comprising an end wall, two sidewalls attached to said end walls such that they are perpendicular to said end wall and parallel to each other, and a plurality of regularly spaced divider plates disposed between said sidewalls and parallel to said end wall so as to define a plurality of rectangular cavities within said frame;
   (b) a plurality of reciprocally movable clamping plates disposed so that there is at least one within each of said cavities;
   (c) independent movement means positioned outside said sidewall attached to said clamping plates and adapted to move each of said clamping plates from a closed position within its cavity to an open position thus creating a space within said cavity into which one of said plate stacks can be inserted; and
   (d) independent bias means attached to said movement means and adapted to return said open positioned clamping plates to final rest position between the open and closed positions wherein said stack is clamped within said cavity so that it cannot move, said bias means being adapted to move each plate individually so that the rest position of one of said movable plates is independent of the rest positions of the remaining clamping plates and each of said stacks is clamped with a uniform pressure.

2. The apparatus of claim 1, wherein said movement means comprises:
   (a) A plurality of swingbolt lugs at least two of which are mounted onto each of said clamping plates, one on either side, each of said swingbolt lugs being mounted through a lengthwise oriented slot in the sidewall, said slot extending from the front to the rear of each of said cavities within said frame, said swingbolt lugs on one side form a row disposed from the front to the rear of said sidewall along its outer side, said lugs further having a hole drilled into its outermost end;
   (b) a set of shafts, at least one disposed on each side of said frame, said shafts being adapted to fit into the holes in said swingbolt lugs and further having a plurality of ring retainer grooves machined therein, each of said grooves being positioned so they are more or less aligned with the front end of each of said slots, said shafts being of such a length that they extend along the full length of the sidewalls from the front to the back of said frame;
   (c) a plurality of spring pads attached to the outer sides of said sidewalls said pads being disposed so that there is one of them located in a position just in front of each of said retainer grooves on said shafts, each of said pads having a hole therein of such diameter and in such position that said shafts will also pass through them;
   (d) a plurality of retainer rings adapted to fit into said ring retainer grooves, said rings being of such diameter and thickness that the forward face of said swingbolt lugs will bear upon them and be restrained by them when said clamping plates are in said closed position; and
   a yoke fitted around the forward end of said frame and further being adapted to receive and clamp said shafts.

3. The apparatus of claim 2, wherein said bias means comprises;
   (a) a plurality of spring retainer cups, one each placed in the rearward side of each of said swingbolt lugs and in the frontward side of each of said spring pads;
   (b) a plurality of compression springs, one each being placed on said shafts in a position between each pair of spring retainers so that there is a spring located essentially opposite and outside of each of said grooves in said side plates, said springs being adapted to hold said compression plates in the closed position so that when a force on the yoke tends to push said yoke rearward relative to said frame, said active pushing causes said shafts to move an equal distance from the front towards the rear of said frame so that said retainer rings will push on said swingbolt lugs causing said movable clamping plates to slideably move within their cavities from the closed to an open position such that one of said stacks can be inserted into the space opened by said rearward movement, said springs further operating to bias each of said clamping plates from the opened to the rest position when said opening force is relaxed and further acting to provide an independent closing force on the plates so that each of said stacks is evenly clamped regardless of its thickness as long as it fits within said open space.

4. The apparatus of claim 3 wherein each of said divider and clamping plates have a plurality of ridges in the sides adjacent to said stacks so that the stack is more firmly held in place.

5. An apparatus for retaining a plurality of battery plates and separators in predetermined stacks, said apparatus comprising:
   (a) a frame member having side walls and at least three divider members which define at least two cavities;
   (b) at least two plate members, one of said plate members disposed within each of said cavities;
   (c) said frame member further comprising parallel slots in the side walls defining said cavities, and said plate members further comprising support members extending through said slots in said side walls, (d) biasing means for individually biasing said plate members from a first position to a second position; said biasing means comprising a plurality of shafts, at least equal in number to said support members, and a plurality of springs at least equal in number to said plurality of shafts wherein each of said springs being positioned so as to urge a support member along as shaft;

(e) movement means to counter said biasing means and move said plate members from said second position to said first position.

* * * * *